United States Patent

[11] 3,594,551

[72] Inventors Harry D. Shearer;
James R. Strain, both of St. Petersburg, Fla.

[21] Appl. No. 597,812
[22] Filed Nov. 29, 1966
[45] Patented July 20, 1971
[73] Assignee Electronic Communications, Inc.

[54] HIGH SPEED DIGITAL COUNTER
7 Claims, 4 Drawing Figs.

[52] U.S. Cl. 235/92 PL, 235/92 R, 235/92 PE, 235/92 LG, 328/48, 307/225
[51] Int. Cl. H03k 21/36
[50] Field of Search 235/92; 328/41, 48; 307/224, 225, 226

[56] References Cited
UNITED STATES PATENTS

| | | | |
|---|---|---|---|
| 2,997,234 | 8/1961 | Hughes | 235/160 |
| 3,422,253 | 1/1969 | Lundin | 235/92 |
| 3,376,410 | 4/1968 | Lundin | 235/92 |

*Primary Examiner*—Maynard R. Wilbur
*Assistant Examiner*—Joseph M. Thesz, Jr.
*Attorney*—Sandoe, Hopgood and Calimafde

ABSTRACT: The input pulses to be counted are supplied to a bit gate and from there are passed to a Divide-by-N circuit. The output of the Divide-by-N circuit is supplied to both a Divide-by-N circuit and back to the bit gate. The pulse being resupplied to the bit gate is employed to inhibit one pulse from passing through the bit gate. After N input pulses have been received, one pulse is inhibited and a one count is recorded by the Divide-by-M register. This process continues until the Divide-by-M register has recorded a number of input pulses equal to the least significant digit of the count. The bit gate is then disabled from subtracting any further pulses during the remainder of the count.

INVENTORS.
JAMES R. STRAIN
HARRY D. SHEARER

BY Hopgood & Calimafde
ATTORNEYS.

INVENTORS.
JAMES R. STRAIN
HARRY D. SHEARER
BY Hopgood & Calimafde
ATTORNEYS.

HIGH SPEED DIGITAL COUNTER

This invention relates to digital counter techniques generally, and in particular, to a novel method and apparatus for the high speed counting of the number of pulses in input pulse stream.

Conventional pulse counters whether synchronous or asynchronous operate on various principles with the maximum counting speed ultimately being dictated by the pulse-to-pulse resolution of the counter and the reset speed. Improved counting techniques, and particularly faster bistable elements, can increase pulse-to-pulse resolution, but the reset function remains an impediment. While the reset function is itself independent upon the speed of the individual bistables and is therefore improving with recent technological advances, it nevertheless exists and must be accounted for in programming.

Accordingly, it is the object of this invention to provide a variable length digital counter chain operable at the highest frequency permitted by the resolution time of the individual bistables incorporated in the chain.

It is a further object of this invention to satisfy the foregoing object by eliminating reset.

It is a still further object of the invention to provide a pulse counter of the foregoing type which is programmable to count a predetermined number of pulses.

It is another object of this invention to provide a programmable counter with a minimum number of control lines being necessary for the program function.

Briefly, the invention is predicated upon the novel technique of subtracting a controllable number of pulses from the input pulse stream and counting the remainder.

The digital counter chain comprises a plurality of individual counters, as required, to monitor the number of total input pulses. The counter chain may be synchronous or asynchronous. Each individual counter has associated with it a digital comparator which constantly monitors the contents of its associated counter with respect to the desired count as impressed upon certain control lines assigned to that counter.

The input pulses to be counted are supplied to a bit gate and from there are passed to a Divide-by-N circuit unaltered. The output of the Divide-by-N circuit is supplied to both a Divide-by-M circuit and back to the bit gate. The pulse being resupplied to the bit gate is employed to inhibit one pulse from passing through the bit gate. Thus, after N input pulses have been received, one pulse is inhibited and one count is recorded by a Divide-by-M register. This process continues until the Divide-by-M register has recorded a number of input pulses equal to the predetermined number to be subtracted from the input pulse stream. This is the number whose digital format is present on control lines connected to the Divide-by-M register. At this time, a number of pulses equal to A has been subtracted from the input stream, and the bit gate is then disabled from subtracting any further pulses during the remainder of the count.

The bit gate is utilized at the input to the counter chain to subtract a number of pulses (A) equal to the least significant digit of the total desired count. In order to completely understand the invention, it is important that this fact be understood.

According to the embodiment of the invention to be described, the Divide-by-M continues to count 1/N pulses until the number received is equal to the number whose digital format is present upon a second set of control lines (B). Upon correspondence to this number, a comparator supplies a pulse which, if comparator B is the last counter in the chain, signals the completed count. If, on the other hand, comparator B is not the last counter, the pulse triggers (as will be seen) an AND gate and the output of the Divide-by-M register is further supplied to another digit counter, Divide-by-P. The input to the Divide-by-P is then the number of input pulses minus the least significant digit (A) divided by NM, or (In X −A)/NM.

The Divide-by-P register will then count the number of pulses received up to the number whose digital format is present on a third set of control lines, C. When the contents of the Divide-by-P are equal to the desired count on the C control lines, a comparator supplies a separate indication to the AND gate which now triggers this gate (since it is coincident with the output from Divide-by-M) and supplies an output indicating that the desired count has been achieved.

To recapitulate the foregoing, the Divide-by-M counter received 1/N pulses from the input stream with the least significant digit subtracted, and the Divide-by-P register receives a pulse from the Divide-by-M register each time the Divide-by-M register has received the count indicated by its control lines.

When all the inputs to the AND gate show correspondence to the desired digits, the bit gate is enabled and all dividers except the Divide-by-N are reset to zero. It may be seen that since the least significant digit A was subtracted from the input, the Divide-by-N will always contain a zero count when the latter counters signals receipt of their desired counts. Thus, reset is eliminated.

The only caveat is that if only two digits are counted, B must always be greater than A. If more than two digits are counted, on the other hand, C must be equal to or greater than 1, and A and B may be any integer.

The above-mentioned and other features and objects of this invention and the manner of attaining them will become more apparent and the invention itself will best be understood by reference to the following description of the embodiments of the invention taken in conjunction with the accompanying drawings wherein.

Figure 1:
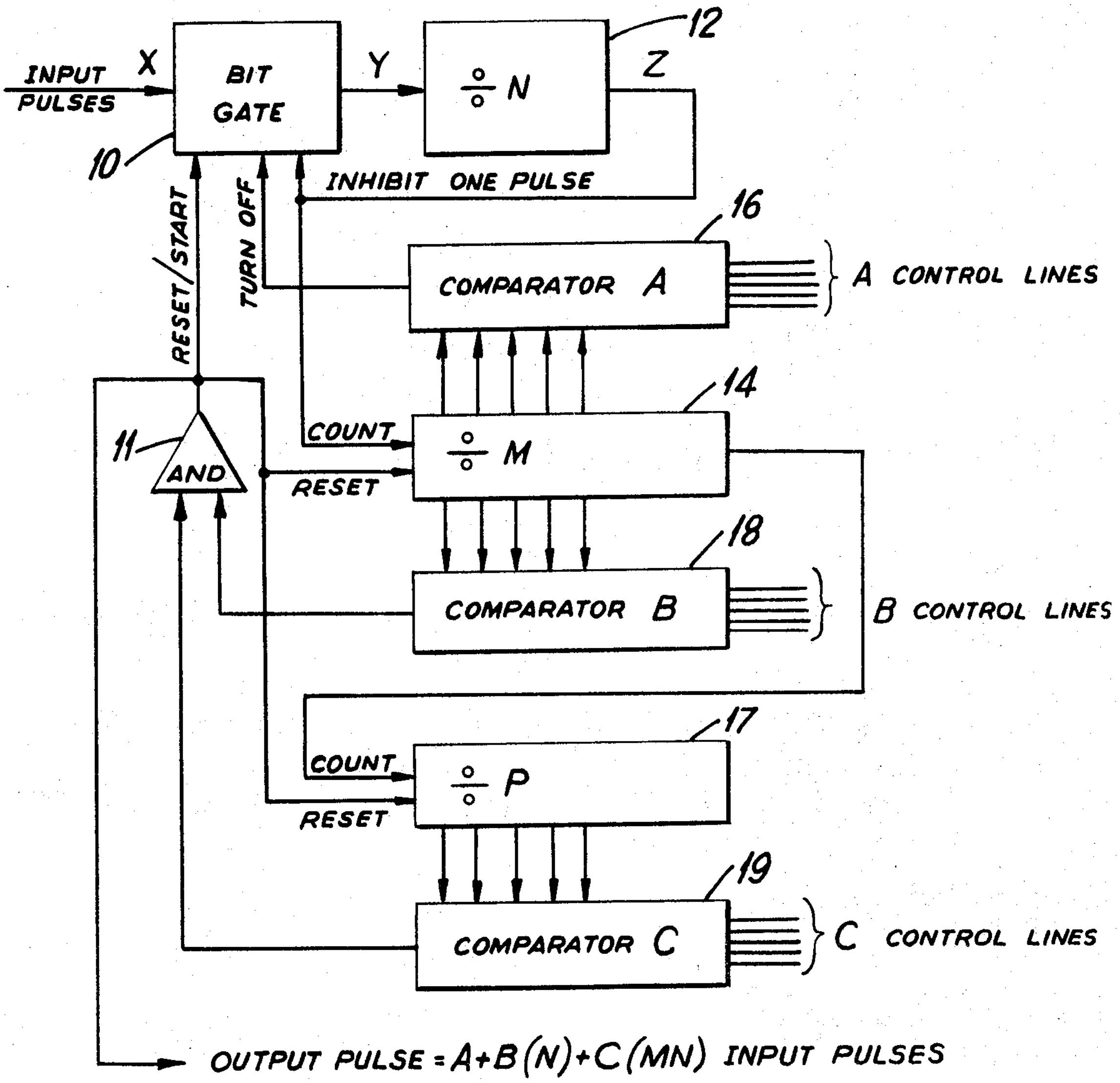
FIG. 1 illustrates one embodiment of the invention in block form.

Turning now to the embodiment of FIG. 1, input pulses X (shown in FIG. 3) are applied to the bit gate 10 whose function and circuitry shall be described. From the bit gate, the pulse stream is applied to the Divide-by-N circuit 12. This latter circuit comprises a ring counter or a binary or ripple type counter, each of which cycles and requires no reset. Each time the Divide-by-N's count reaches N, it gates a single pulse out of its own input stream. This pulse which is shown by curve Z in FIG. 3, and is not necessarily synchronous to the input pulses, is fed back to the bit gate where it is applied as an inhibit pulse upon that gate.

Figure 3:
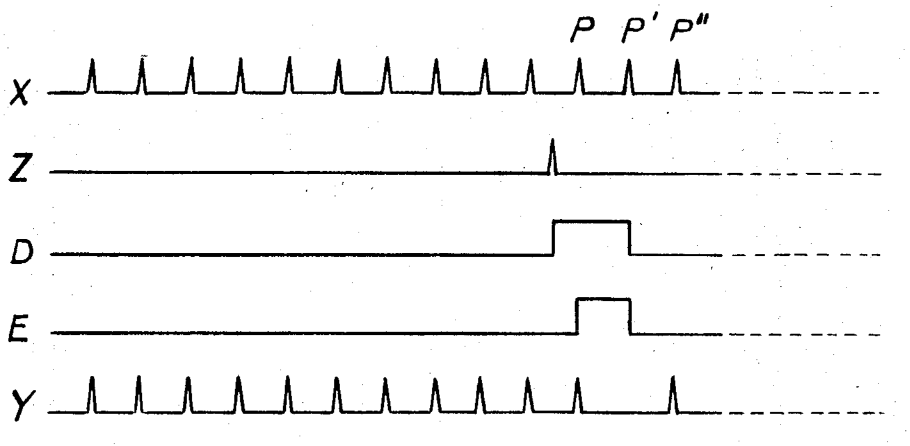
FIG. 3 is a pulse diagram useful for explaining the invention.

In the depicted pulse illustration of FIG. 3, it has been assumed that N equals 10 (decade). It has further been assumed that the delays through the counter are smaller than pulse-to-pulse spacing so that the Z pulse occurs between the tenth and eleventh X pulse. It is to be understood, however, that while the Z pulse is asynchronous as shown, it need not necessarily occur precisely in the place shown but would be effective regardless of propagation delay so long as the delay remains within practical limits. That is, the count is sufficiently great with respect to the delay so that a pulse exists to be inhibited after the deletion of the last pulse of the least significant digit is to be effected.

The Z pulse is fed back to the bit gate where it is employed in a manner to be described to inhibit one subsequent input pulse. Precisely which input pulse is inhibited is not significant since as is described, it is only necessary that the last inhibition take place before the total input pulse stream is received. In the embodiment to be described, it will be assumed (see curve Y of FIG. 3) that the 12th pulse is the one which is inhibited or deleted. Simultaneous with the application of the inhibit pulse to the bit gate, the Z pulse is also fed to the Divide-by-M counter or register which is thereby triggered once for each roll over count of N.

Figure 4:
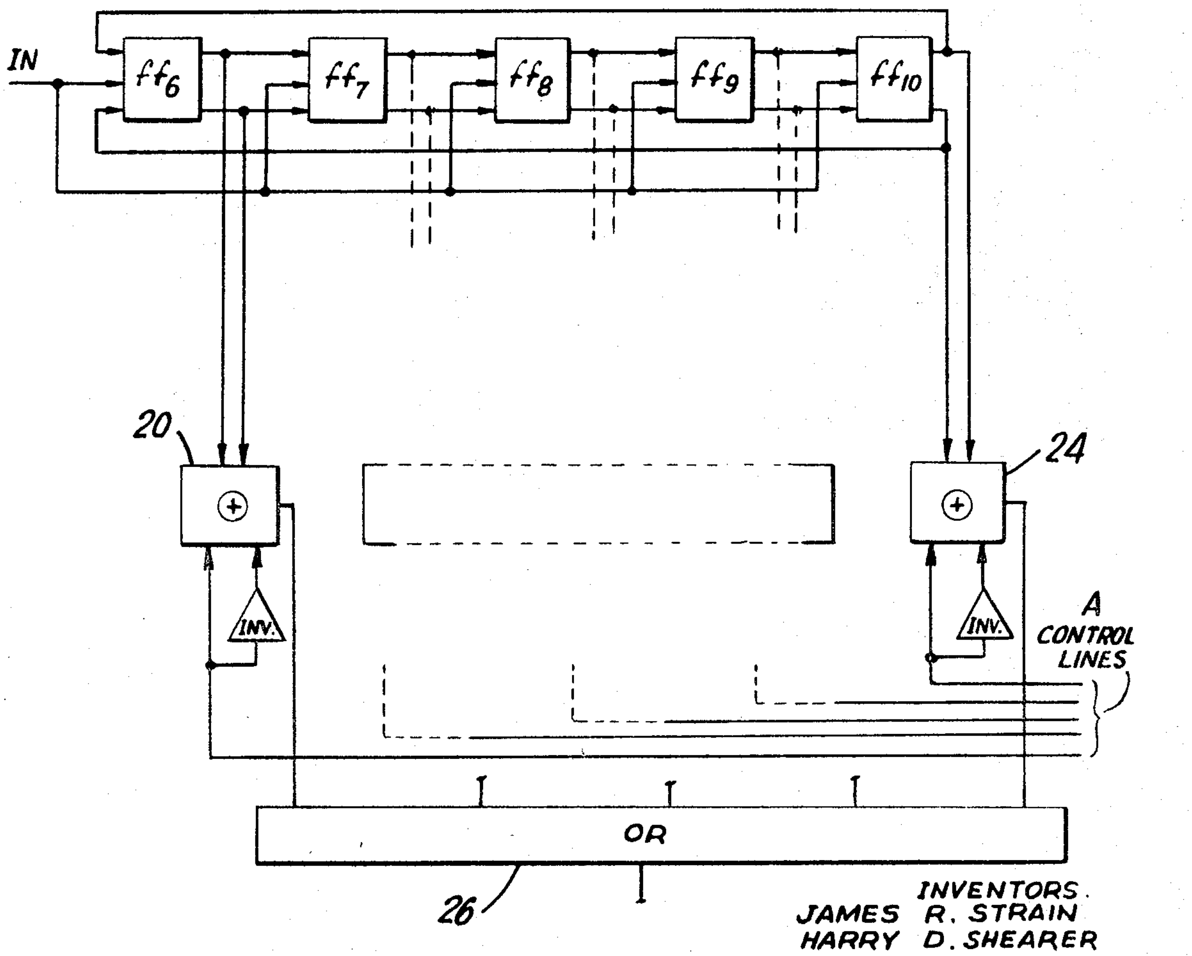
FIG. 4 illustrates an exemplary counter and comparator depicted in FIG. 1.

An exemplary Divide-by-M counter 14 is shown in the upper portion of FIG. 4. Such a counter, comprising five flip-flops ($ff_6$ to $ff_{10}$) are well known in the art. Suffice it to say, that the input pulses to the counter Divide-by-M trigger flip-flops six to 10 in seriatum to record the number of input pulses. Depending upon the functional requisites, the count may be imposed in binary fashion, decimal fashion, etc. The counter shown is a shift register type which divides by 10 in the sequence of the input pulses. One stage changes on each pulse and it is a cyclic divide by 10, each stage running at one-fifth the input frequency.

The output of the counter stage feeds directly into a comparator (eg. 16, 18 or 19) which comprises five modulo-two elements 20—24 (half-adders). The half-adders are actually used as exclusive OR's, the sum being the only function that is used, and the carry function which is available on the half-adder not being used. The output of all the half-adders is as shown OR'd by gate 26. The alternative inputs to the half-adders are imposed by any of the control lines A, B and C. For the example shown in FIG. 3, the A control lines are shown connected. Control signals may be applied by two out of five code etc.

It will be appreciated by those skilled in the art that both the comparator and the counter are exemplary only. It is only necessary that the desired functional requisites be achieved. That is, that in the embodiment shown, the control lines be programmable to dictate a predetermined count of the number of pulses to be recorded in the Divide-by-M register. In the example shown, if A, the number of the least significant digit, were to be 10, comparator A would be triggered when the Divide-by-M register had recorded a count of 10. The output from comparator A's OR gate would then be employed to turnoff the inhibit function of the bit gate (in a manner to be described). From this point in time onward, no more pulses would be subtracted from the input pulse stream and all pulses would be effective to trigger the counting registers. When the Divide-by-M register has reached a count equal to the number present on control lines B, comparator B pulses the AND gate (FIG. 1). Also, each time the Divide-by-M register completely cycles, i.e., counts M pulses, it supplies a pulse to the next digital counter Divide-by-P (17). The input to the Divide-by-P counter is thus the number of input pulses minus A (the least significant digit) divided by MN, or (In X −A)/MN.

The Divide-by-P will continue to count the number of pulses received until the registered number of P pulses is equivalent to those on the C control lines. At this time, comparator C and B will simultaneously pulse AND gate 11 resetting the bit gate for the next count. This resetting of the bit gate (as will be shown) is no more than allowing the inhibit pulse to once again effect its function. The output from AND gate 11 is further employed to reset both the Divide-by-M and the Divide-by-P counters 14 and 17. However, as will be appreciated, these counters operate at a submultiple of the speed of the Divide-by-N counter and their resetting is not significant since until the Divide-by-N counter turns over once the Divide-by-M is not triggered. Finally, the output of AND gate 11 is employed to trigger one output pulse indicating the desired count which in this case is A +B(N) +C(MN) input pulses.

Figure 2:
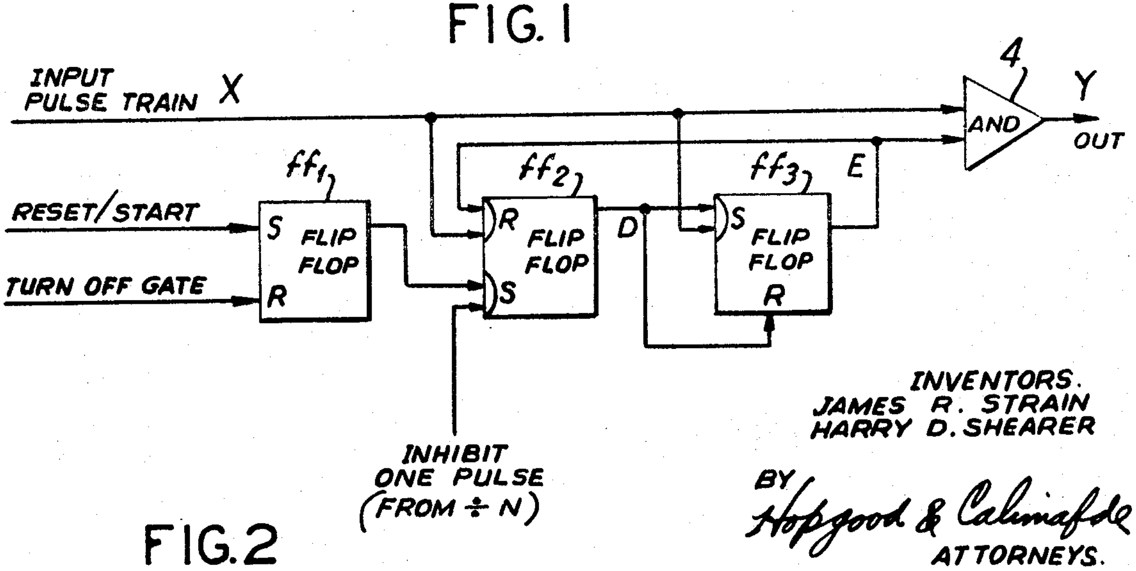
FIG. 2 shows a detail of the bit gate of FIG. 1 in block form.

The bit gate whose external functioning has been relied upon in the foregoing description will now be described in detail with reference to FIG. 2. As may be seen, the bit gate comprises three flip-flops, $ff_1$ to $ff_3$, and an AND gate 4. The first of these flip-flops, $ff_1$, merely fulfills a switching function: a reset or start pulse triggering an enabling input to allow an inhibit pulse from the Divide-by-N register to set flip-flop $ff_2$. In the beginning, Y pulses (see FIG. 3) will appear at the output of AND gate 4 on a one-to-one basis with respect to the input X pulses.

Eventually, in the manner which has been described, the Divide-by-N register will have counted N pulses and will apply an inhibit pulse to the set input of flip-flop $ff_2$. This inhibit pulse because it bears propagation delays through the counter is (as has been mentioned) not necessarily synchronous with input pulse train. Point D now (FIGS. 2 and 3) goes positive allowing the next pulse, pulse P (FIG. 3) to set the third flip-flop. Flip-flop $ff_3$ acts as an inhibit upon AND gate 4. Being inhibited, the next pulse (P′) on the output stream is deleted. Flip-flop $ff_2$ sees this pulse P′ as a reset and in turn its fall will reset flip-flop $ff_3$ to insure the next pulse (P″) coming through is not deleted. From this time onward, pulses will be passed until such time as the Divide-by-N has rolled over again and has placed another inhibit pulse on the set input to flip-flop $ff_2$ in which case the process is repeated.

When the output of comparator A (FIG. 1) has signalled that a number of pulses equal to the least significant digit has been subtracted from the input pulse stream, comparator A supplies an output (turn OFF in FIG. 1) which turns off the bit gate, thereby obviating its function as a pulse deletor. Turnoff is effected by resetting the first flip-flop $ff_1$ as shown.

While the principles of the invention have been described in connection with specific apparatus, it is to be clearly understood that this description is made only by way of example and not as a limitation to the scope of the invention as set forth in the objects thereof and in the accompanying claims.

We claim:

1. The method for counting a predetermined number of pulses in a pulse train sequence, comprising storing a preselected number less than the predetermined total pulse count, passing said input pulse train through subtraction means for producing a modified pulse train at the output of said subtraction means by subtracting a number of said input pulses corresponding in number to said stored preselected number, said pulse subtraction step comprising repeatedly counting said modified pulses in a cyclic counter which provides an output signal each time a reference counting state is obtained, initially suppressing one pulse of said input pulses train in said subtractor means responsive to each output pulse produced by said cyclic counter, counting the output signals produced by said cyclic counter, comparing the number of counted output pulses produced by said cyclic counter during a pulse-counting cycle of operation with said stored preselected number, and inhibiting said subtractor means from suppressing any further pulses from the input pulse train after the counted number of output pulses produced by said cyclic counter first equals said stored preselected number.

2. The method as in claim 1, wherein the preselected number of pulses subtracted from the input pulse train corresponds to the least significant digit of said predetermined number of pulses.

3. A high-speed digital counter for counting a predetermined number of pulses in an input pulse train sequence, comprising cyclic-counting means, selective pulse suppression means disposed intermediate the input pulse train and said cyclic-counting means, said cyclic means including means for supplying an output signal each time a reference state is attained thereby, additional counting means connected to said cyclic counting means, means included in said selective pulse suppression means selectively responsive to an output from said cyclic-counting means for suppressing a pulse from said input pulse train, and comparator means responsive to a particular count state in said additional counting means first attaining a preselected number during a composite counting cycle for inhibiting any further pulse suppression by said pulse suppression means during the pulse-counting cycle.

4. A combination as in claim 3 further comprising additional comparator means connected to said additional counter means for signaling the incidence of said predetermined number of pulses.

5. A combination as in claim 4 wherein additional comparator means further comprises means for restoring said pulse suppression means to a pulse suppression mode of operation, and for resetting said additional counting means responsive to the incidence of said predetermined number of pulses.

6. A combination as in claim 3 wherein said preselected number of pulses corresponds to the least significant digit of said predetermined count.

7. A combination as in claim 3 wherein said selective pulse suppression means comprises bit gate means including means for passing said input pulse train through said bit gate means, means responsive to a pulse from said cyclic-counting means for suppressing a pulse in said pulse train, and means responsive to the next pulse in said train for permitting said pulse and succeeding pulses in said pulse train to pass.